April 15, 1958          R. W. WARING          2,830,468
VARIABLE-SPEED TRANSMISSION AND METHOD OF OPERATION
Filed May 31, 1952          3 Sheets—Sheet 1
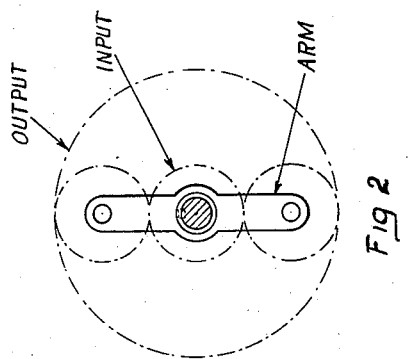
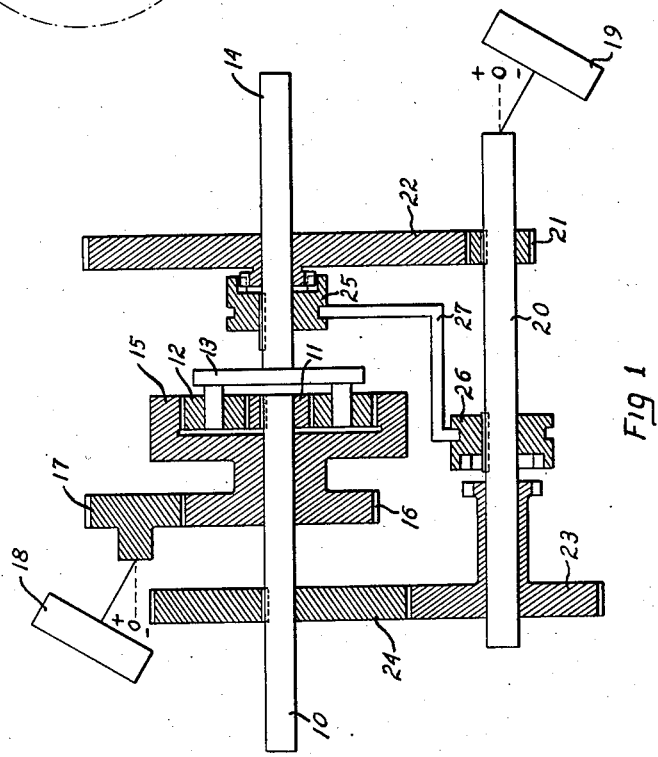
INVENTOR
ROBERT W. WARING
BY
ATTORNEY

INVENTOR.
ROBERT W. WARING

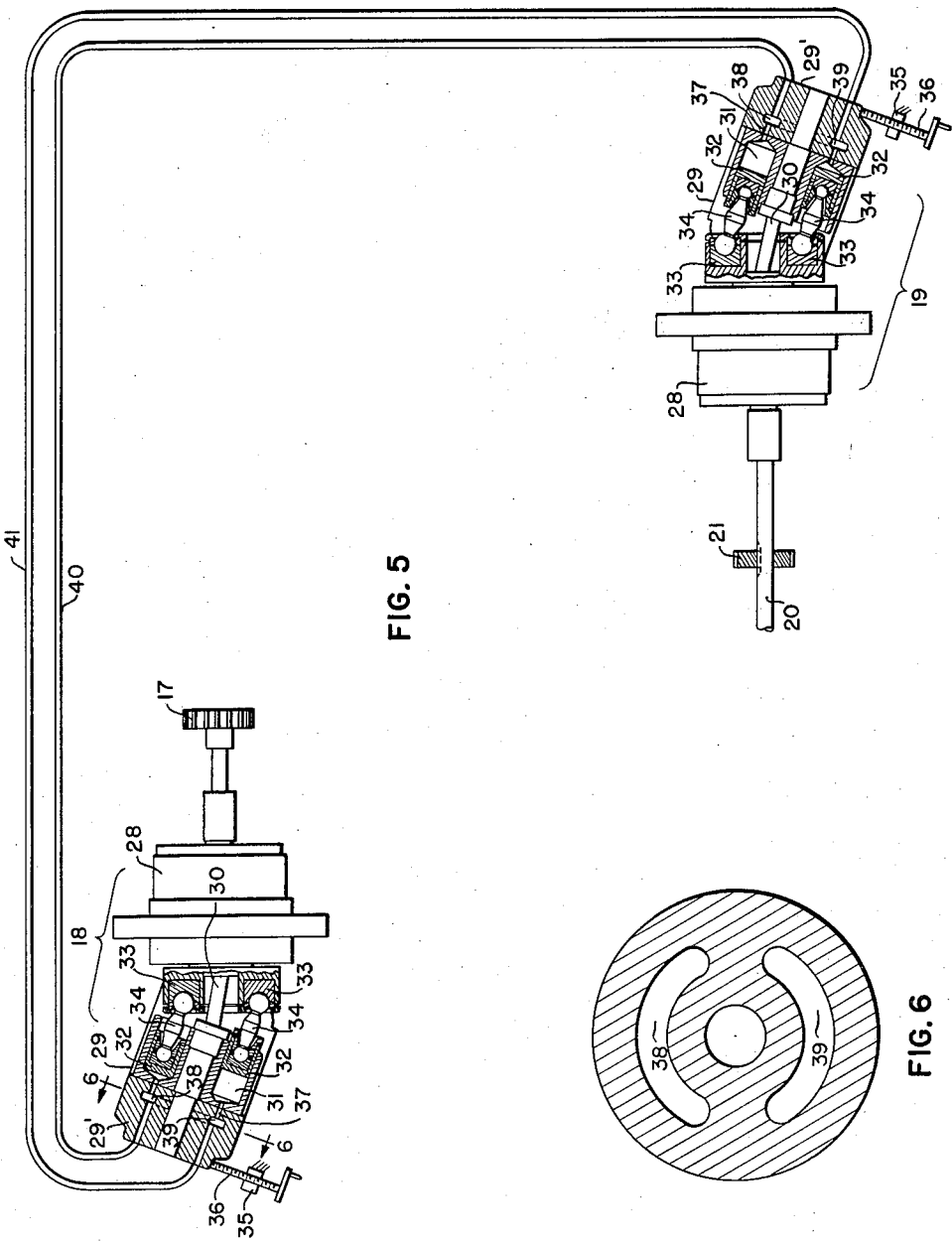

United States Patent Office 2,830,468
Patented Apr. 15, 1958

2,830,468
VARIABLE-SPEED TRANSMISSION AND
METHOD OF OPERATION

Robert W. Waring, Fairfield, Conn.

Application May 31, 1952, Serial No. 290,847

15 Claims. (Cl. 74—687)

This invention relates to variable-speed transmissions, and particularly to that type of variable-speed transmissions that employ epicyclic gear trains in combination with variable-speed mechanism.

The primary function of any epicyclic system when used for transmitting power is to provide a different output speed from the input speed, and simultaneously to change the output torque inversely with respect to the speed ratio. Assuming an efficiency of 100%, such relation can be expressed in the following equation: $S_i/S_o = T_o/T_i$, in which $S_i$ is the input speed, $S_o$ is the output speed, $T_i$ is the input torque and $T_o$ is the output torque.

All epicyclic transmissions include a reactor which when held against rotation produces, with a given input speed, a "base" output speed that depends upon the gearing ratio of the epicyclic train. Speeds of the output shaft below the so-called "base" output speed can be effected by permitting rotation of the reactor; and output speeds above said "base" speed can be effected by causing the reactor to rotate in a direction opposite to that which it rotates for output speeds below said "base" speed. Accordingly, any force that varies the reactor speed to provide output speeds below "base" speed provides power flowing from the reactor; and any force that varies the reactor speed to provide output speeds above "base" speed provides power flowing to the reactor.

An efficient transmission must at all speeds, except near zero, be capable of transmitting substantially the full power supplied to the input shaft. In order to satisfy the above torque-speed equation, it is evident that the torque developed by the output shaft must differ from that which would be developed at the "base" speed due to the gear ratio of the epicyclic train alone. Specifically, it is evident that at output speeds below "base" speed, output torque must be higher, and conversely, at output speeds above "base" speed, output torque must be lower than that supplied by the epicyclic gear ratio alone at "base" speed. For example, with an epicyclic train having a gear reduction ratio of 3:1 (Fig. 2), if the input speed is 1200 R. P. M. and the input torque is 1000 inch pounds, the "base" output speed and corresponding torque are 400 R. P. M. and 3000 inch pounds, respectively. If, however, the required transmission output speed were 200 R. P. M., then it would be necessary to produce 6000 inch pounds of torque on the output shaft to transmit all of the power supplied to the input shaft. Again, if the required output speed were 800 R. P. M., then the required output torque would be 1500 inch pounds. It is therefore obvious that auxiliary means must be employed to produce the necessary variations in speed and torque at the output shaft on each side of "base" speed in order to deliver therefrom substantially all the power that is supplied to the input shaft.

Prior-known transmissions of the type to which the principles of this invention relate, vary the reactor speed to secure desired output speed and torque characteristics by connecting one end of a variable-speed system to either the input or the output of the epicyclic gear train, and connecting the other end of said variable-speed system to the reactor. This arrangement is satisfactory when the one end of the variable-speed transmission is connected to the output of the epicyclic system during output shaft speed below "base" speed (i. e. power flowing from the reactor), and to the input during output shaft speed above "base" speed (i. e. power flowing to the reactor). Should, however, such connections be reversed, namely, with the one end of the variable-speed system connected to the input of the epicyclic gear train during output shaft speed below "base" speed (i. e. power flowing from the reactor), or to the output shaft during output shaft speed above "base" speed (i. e. power flowing to the reactor), then a condition commonly referred to as circulating or regenerative power will occur which may result in a loss of efficiency. Expressed otherwise, when this flow of power from the reactor is returned to the transmission at a point nearer the prime mover than the reactor; and when the flow of power to the reactor is taken from the transmission at a point further from the prime mover than the reactor, a condition of circulating power exists.

Generalizing therefore, when power is extracted from a point in a transmission of the above-referred-to type, and returned thereto through the variable-speed system to a point nearer the prime mover than the point from which it was extracted, a condition of circulating power or power feed-back occurs which may equal or exceed the total power transmitted through the transmission. For example, the epicyclic transmission previously referred to is essentially a device for reducing the speed of the output shaft to ⅓ that of the input shaft and accordingly, multiplying the torque of the input shaft three times. Should such a transmission be required to produce an output speed equal to the input speed, the epicyclic gearing would still multiply the input torque three times and a condition would exist whereby the apparent output power of the epicyclic unit alone would be three times the input power (speed times torque). Assume an input speed of 1200 R. P. M., an input torque of 1000 inch pounds, and that the one end of the variable-speed system is connected to the output shaft with its other end connected to the reactor. Should 1200 R. P. M. be required at the output shaft, then 3000 inch pounds of torque should also be present. However, since the transmission can only deliver 1000 inch pounds of torque at 1200 R. P. M., 2000 inch pounds of torque at 1200 R. P. M. must be absorbed from the output shaft by the variable-speed system and delivered to the reactor as power which causes its rotation in a manner to provide the required speed of 1200 R. P. M.

As will be shown later (column 4, line 35) from the gear train value formula (Elements of Mechanics, Schwamb, Merrill and James, 6th edition, p. 300), the reactor speed for this illustration (Fig. 2) is 600 R. P. M. and since the torque of the reactor is 4/3 that of the output torque (4×input torque) or 4000 inch pounds, it will be evident that the product of reactor speed times reactor torque is twice the product of speed times torque of the input or output shafts. Therefore, twice as much feed-back power is being circulated in the transmission as is being passed through it.

Assume again that the transmission is operated at an output speed below "base" speed, say, 133 R. P. M., and the one end of the variable-speed system is connected to the input shaft, and the other end to the reactor. Under these conditions, 9000 inch pounds of torque would be required at the output shaft if the transmission is to deliver the total power supplied to it. To get such torque, power will have to be absorbed from the reactor to develop 2000 inch pounds additional torque to complement the input torque of 1000 inch pounds—the sum being multiplied by the epicyclic gearing to produce the final 9000 inch pounds output torque. The reactor speed for this illustration is 200 R. P. M. and the reactor torque is again 4/3 of output torque or, in this case, 12,000 inch pounds [4×(input torque+2000)]. Accordingly, the product of reactor torque and reactor speed (feed-back power) is again twice the power of the input or output shafts.

From the foregoing, it is evident that prior-known transmission of this type if required to operate over a substantial range on each side of "base" speed must be provided with a relatively large variable-speed auxiliary means capable of handling considerably more power than that which is delivered by the transmission.

This application is a modification of the invention shown, described and claimed in application Serial No. 279,717, filed April 1, 1952, in the name of Edward P. Bullard III. The above-referred-to invention of Edward P. Bullard III, is particularly advantageous where large amounts of power are being handled because a relatively low-powered auxiliary variable-speed system can be employed to control the operation of the transmission. Considerable simplification of the transmission can be effected if the transmission is to carry relatively moderate amounts of power while still retaining the advantages of the above-referred-to invention, namely, the amount of power that flows through the auxiliary variable-speed system will at all times be less than that which passes through the transmission while at the same time throughout the entire speed range of the transmission, no so-called circulating power will be present.

It has been found that when power is extracted from a point in a transmission of the above-referred-to type, and returned thereto through the auxiliary variable-speed system to a point nearer the output shaft than the point from which it is extracted, then a condition occurs, which, for the purpose of this invention and to distinguish from feed-back power, will be referred to as transfer power. Like the transfer power of the application above-referred-to, this transfer power never equals or exceeds the total power that passes through the transmission. That is to say, when power is supplied to the reactor of the epicyclic gearing from the input side of said gearing for varying the speed-torque characteristics of the output shaft; and when the power extracted from the reactor of said gearing to vary said characteristics is returned to the transmission on the output side of said gearing, then the above-described condition of transfer power exists and no circulating power is present. Maintaining this relationship of transfer power permits the design of a transmission of this type wherein the capacity of power transmission of the auxiliary variable-speed system may be less than the total power transmitted through the transmission, and only a single epicyclic gearing arrangement is employed.

The principal object of this invention is to provide an infinitely variable-speed transmission including epicyclic gearing in which no circulating or feed-back power is developed over the entire operating range of said transmission.

Other objects include the provision of such a transmission in which an auxiliary variable-speed mechanism is employed to vary the output characteristics of speed and torque of the transmission; the provision of such a transmission in which throughout the latter's entire operating range, the variable-speed mechanism is required to pass less power than the total power that passes through the transmission; the provision of such a transmission in which the power transmitting capacity of the auxiliary variable-speed mechanism may be reduced to a point where it is required to pass only a fraction of the total power transmitted through the transmission; the provision of such a transmission in which the operating range may extend from zero to a value in excess of input speed; the provision of such a transmission in which substantially constant horsepower is developed over substantially the entire operating range of the transmission; the provision of such a transmission in which the output torque thereof may be intentionally limited at low output speeds to prevent damage to the driving or driven mechanism; the provision of such a transmission in which the output torque can be controlled and varied throughout the speed range of the transmission to provide substantially constant horsepower, substantially constant torque, or a combination of the two throughout substantially the entire speed range of the transmission; and the provision of such a transmission in which a substantially exact ratio of input to output speed is obtained regardless of the percentage of full load passing through the transmission.

The above, as well as other objects and novel features of the invention will become apparent from the following specification and accompanying drawings, in which:

Figure 1 is a schematic diagram of a 4/1 transmission to which the principles of the invention have been applied;

Fig. 2 is a schematic diagram of a 3/1 epicyclic gear train;

Fig. 5 is a more detailed view of units 18 and 19 of Fig. 1; and

Fig. 6 is a sectional view taken substantially along line 6—6 of Fig. 5.

Figure 3:
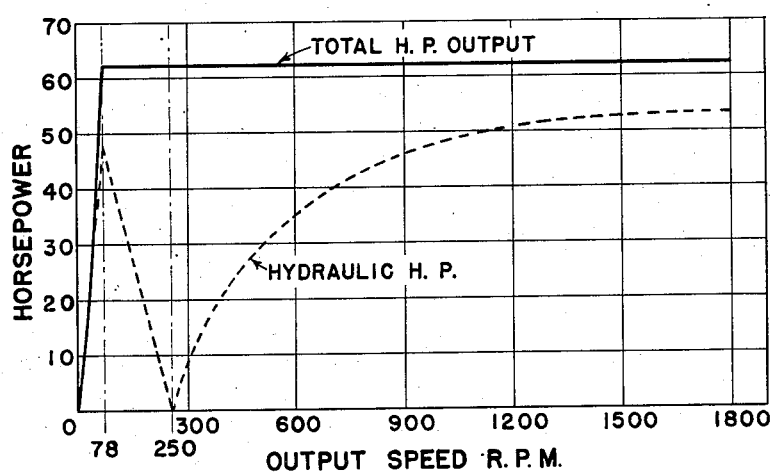
Fig. 3 is a graph showing the horsepower characteristics of the apparatus of Fig. 1.

As suggested at an earlier point in the specification, the gear train value of any epicyclic train can be expressed as follows:

$$e = \frac{\text{speed of the last wheel relatively to the arm}}{\text{speed of the first wheel relatively to the arm}}$$

considered with the arm held fixed.

From the above, the gear train value "e" of each of the epicyclic gearing arrangements of Figs. 1 and 2 is —1/3. From this value, any speed and direction of rotation of the various gears and shafts of the transmission can be determined.

Referring to Fig. 1, the principles of the invention are shown as applied to a transmission including an input shaft 10 to the one end of which is fixed a sun gear 11 and to the other end of which a prime mover (not shown) is adapted to be connected. The sun gear 11 meshes with planetary gears 12 in a 1/1 ratio which planets are journaled on studs fixed to an arm 13 integral with an output shaft 14. The planet gears 12 are in mesh in a 3/1 ratio with an internal ring gear 15 that is connected to a spur gear 16 which latter meshes with another spur gear 17 in a 2/1 ratio. The spur gear 17 is rotatably connected to a hydraulic unit 18 (to be described later) which, in the present embodiment, is of the positive displacement variable capacity type shown and described in Patent No. 1,931,969, to which patent reference is also made in Patent No. 2,155,455 to Hans Thoma. The hydraulic unit 18 is adapted to be connected to a similar hydraulic unit 19 in a closed system through flexible conduits (Fig. 5) which convey liquid between the units during their operative cycles.

The hydraulic unit 19 is rotatably connected to a back shaft 20. Spur gear 21 is keyed to back shaft 20 and meshes in a 6/1 ratio with a spur gear 22 journaled on driven shaft 14. Journaled on back shaft 20 is a spur gear 23 that meshes in a 3/2 ratio with a spur gear 24 that is keyed to input shaft 10. Clutches 25 and 26 are splined to driven shaft 14 and back shaft 20, respectively, and actuator 27 connects these clutches so that movement of the connector 27 to the left as viewed in Fig. 1, connects gear 23 to shaft 20 and disengages gear 22 from shaft 14. Movement of the connector 27 rightwardly as viewed in Fig. 1, effects disengagement of gear 23 from shaft 20 and engagement of gear 22 to shaft 14.

The hydraulic units 18 and 19 are identical and are shown in detail in Figs. 5 and 6. Referring to Fig. 5, only the unit 18 will specifically be described. It includes a rotatable coupling member 28 that is fixed to gear 17 (Fig. 1). The unit 18 also includes a rotatable cylinder mechanism 29 that is connected to and rotatable with the coupling 28. A sliding seal connection is provided between mechanism 29 and a non-rotatable manifold portion 29'. The mechanism 29, however, is adapted to be moved adjustably to different positions within the plane of the paper about an axis within the coupling member 28. Universal joints are provided at each end of a shaft 30 for connecting the members 28 and 29. A plurality of cylinders 31 are provided in the member 29, and they are equally spaced about the axis of rotation thereof. Pistons 32 are adapted to be reciprocated within the cylinders 31, and are connected to universal ball joints 33 by connectors 34. Mechanical means, such as a stationary nut 35 and screw 36 that may be connected to the manifold 29 by a swivel joint, are provided for adjusting the position of the cylinder mechanism 29. Each of the cylinders 31 is provided with a port 37 that cooperates with ports 38 and 39 (Fig. 6). Port 38 is connected to a corresponding port in unit 19 by a flexible conduit 40, while the port 39 is connected to a corresponding port in unit 19 by a duct 41.

The construction and arrangement of the parts are such that each device 18 and 19 acts as a wobble plate type of pump or motor depending upon whether the unit is rotated mechanically or by the flow of liquid within conduits 40 and 41.

Assume that the apparatus is set such that the displacement of the unit 18 is 0 and that of unit 19 is −30°; that shaft 10 is rotating at a constant speed of 1000 R. P. M. by a prime mover that is capable of impressing 4000 inch pounds thereon; and the connector 27 is in position effecting the engagement of clutch 25 with gear 22 and the disengagement of clutch 26 from gear 23.

Under the above circumstances, the speed of the output shaft 14 is 0 since the displacement of the hydraulic unit 18 is 0, which latter permits ring gear 15 to rotate freely, hence shaft 14 does not rotate. Not only does shaft 14 not rotate by virtue of the idle condition of ring gear 15, but since the displacement of unit 18 is 0, no oil can be pumped between the units 18 and 19, and accordingly, a locked condition of shaft 14 exists. Changing the displacement of the unit 18 to positive values while retaining the unit 19 at −30° causes the former to pump liquid through line 40 to the unit 19 which in turn tends to rotate the shaft 14 through the gears 21 and 22. The exhaust from unit 19 is returned to the unit 18 through the line 41. Rotation of the input shaft tends to rotate the output shaft 14 since reaction torque on the ring gear 15 is being developed by the resistance of unit 18.

Figure 4:
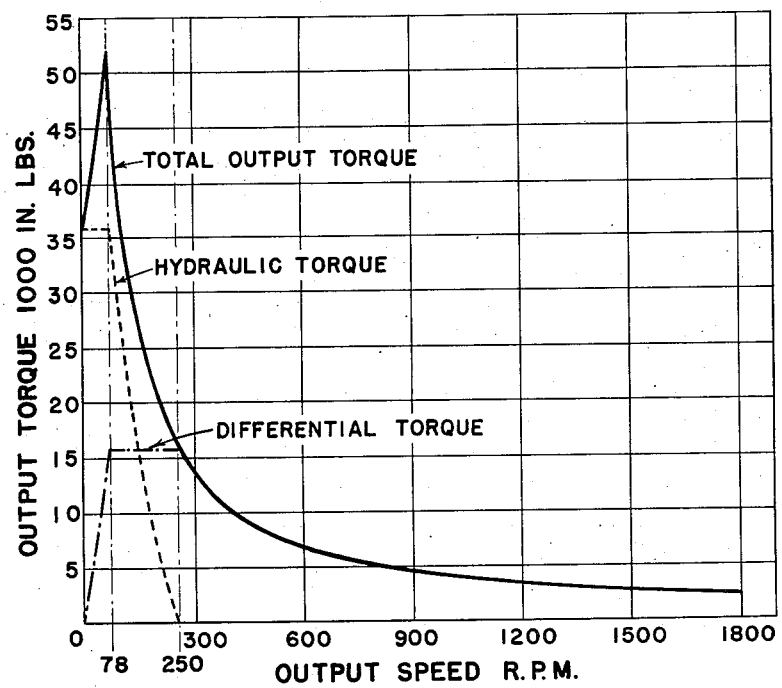
Fig. 4 is a graph of the torque characteristics of the apparatus of Fig. 1.

Referring to Figs. 3 and 4, characteristics of the transmission as shown in Fig. 1 are shown graphically under a theoretical performance based on an input speed of 1000 R. P. M., 4000 inch pounds of torque, and as assumed efficiency of 100%. The solid line curve of Fig. 3 represents total horsepower output of the transmission which, for the embodiment disclosed, is substantially constant throughout substantially the entire speed range thereof. The dotted line curve represents that portion of the total horsepower that passes through the variable-speed mechanism and which, in the embodiment disclosed, is hydraulic power. In Fig. 4, the solid line curve represents the total output torque of the transmission; the dotted line curve represents the torque developed by the hydraulic units 18 and 19 and which is delivered to the output shaft; and the dot and dash line curve represents the torque passing through the epicyclic gearing. It will be noted that the dotted line curve of Fig. 3 contacts the abscissae at two points during the entire speed range of the transmission, the point other than the one at zero speed representing "base" speed of the epicyclic gearing arrangement of the embodiment disclosed. Whereas a plurality of points of zero hydraulic horsepower other than the one at zero speed occurred with the mechanism of the above-identified application of Edward P. Bullard III, the present invention contains only one point along the abscissae of zero hydraulic horsepower other than the point of zero speed.

Displacement of the unit 18 from zero as above stated, and depending upon the load to be rotated by the output shaft, pressure will be built up in the hydraulic system until sufficient torque has been developed to cause rotation of the shaft 14. For the design of the present embodiment, a maximum pressure of 2500 p. s. i. and a maximum displacement for each of the hydraulic units 18 and 19 of 15 cubic inches per revolution has been selected. Under these conditions, it is evident from Fig. 4 that a maximum stall torque of 36,000 inch pounds will be developed. This can be substantiated through reference to standard hydraulic formulae.

The displacement of the unit 18 increases up to the maximum amount required to develop sufficient resistance in the epicyclic train to pass full input torque to shaft 14. Simultaneously, the output torque on shaft 14 and the horsepower passed through the transmission increase to the full amount supplied from the prime mover. It is also evident from Fig. 3 that the hydraulic portion of this power passing through the variable-speed unit during this portion of the first phase of operation increases to a maximum. Accordingly, it is evident that at this point of operation, namely, 78 R. P. M., the hydraulic unit 19 supplies 36,000 inch pounds of torque to the output shaft 14 and the remaining 16,000 inch pounds of torque is composed of 4000 inch pounds passing directly through the epicyclic train and multiplied by the gear ratio 4/1. This total torque of 52,000 inch pounds is sufficient to develop full horsepower at the output shaft with a speed of 78 R. P. M., thereby satisfying the equation $S_i/S_o = T_o/T_i$, at 100% efficiency.

Increasing the displacement of the unit 18 to a maximum of +30° and thereafter changing the displacement of unit 19 from −30° to zero, causes shaft 14 to increase in speed so that decreasing values of output torque are required to maintain constant horsepower (Figs. 3 and 4).

Since it is one of the aims of this invention to pass as nearly as possible full power through the epicyclic gearing, it is necessary to develop sufficient reaction torque by the unit 18 to permit full input torque to reach shaft 14. Maintaining this relationship of sufficient reaction torque by the unit 18 (constant) as the total output torque decreases with increasing output speed, it follows that the hydraulic torque and power of the unit 19 decrease to maintain constant output horsepower. This condition prevails until shaft 14 is rotating at 250 R. P. M. when all hydraulic power flow through the variable-speed system ceases and all power output passes directly through the epicyclic gearing. Under this condition of unit 19 being at zero displacement, ring 15 is locked and shaft 20 is permitted to idle at 1500 R. P. M. because the gear ratio between 22 and 21 is 6/1.

Since shafts 10 and 14 are rotating at 1000 and 250 R. P. M., respectively, shaft 20 is idling at 1500 R. P. M.; and gear 23 is rotating at 1500 R. P. M. since the gear ratio between it and gear 24 is 3/2. Accordingly, clutch actuator 27 can be moved leftwardly, as viewed in Fig. 1, to effect the connection of gear 23 to shaft 20 and the disengagement of clutch 25 from gear 22. This shifting conditions the apparatus so that phase 2 of the operation can be developed, namely, increasing the output speed of shaft 14 above 250 R. P. M.

With clutch 26 in engagement with gear 23, all output power continues to be transmitted through the epicyclic gear train to the output shaft 14 since such shifting in no way changes the apparatus from its condition at the end of phase 1.

Changing the displacement of the unit 19 from zero (its displacement at the end of phase 1) to positive values (they were negative in phase 1) causes unit 19 to pump liquid through line 40 to unit 18 rotating the latter oppositely from its rotation during phase 1, the exhaust from unit 18 returning to unit 19 through line 41. It will be remembered that at the end of phase 1, the rotation of the ring gear 15 was zero due to the locking of gear 17 against rotation when the displacement of the unit 18 was +30° and that of unit 19 equal to zero. Accordingly, in the second phase of the operation of the invention, the ring gear 15 is rotated in the opposite direction from that in phase 1, and the speed of shaft 14 continues to increase. As the speed of the output shaft 14 increases during this second phase (see Figs. 3 and 4), constant output horsepower can be maintained with a reduction of total output torque. This condition can be satisfied without developing any so-called circulating horsepower by taking off part of the input torque from shaft 10 and transmitting it through gears 24, 23 and utilizing it to rotate the unit 19 as the latter's displacement is changed from zero (its position at the end of phase 1) to plus values of increasing amount. The power absorbed by the unit 19 is transmitted hydraulically to the unit 18 and is used to cause the rotation of the ring gear 15 at a rate, and with sufficient torque to permit the epicyclic gear train to pass the required output torque at the desired output speed while maintaining constant output horsepower.

It will be evident that the operation of the transmission is such as to always extract power from a point in the transmission and return thereto through the hydraulic units 18 and 19 to a point nearer the output shaft than the point from which it was extracted.

Although the various features of the new and improved transmission have been shown and described in detail to fully disclose one embodiment of the invention, it will be evident that numerous changes may be made in such details without departing from the principles of the invention.

What is claimed is:

1. A variable-speed transmission comprising in combination, an input shaft adapted to be rotated and to be subjected to an input torque by a prime mover; an output shaft steplessly rotatable over a speed range from zero to speeds in excess of that of said input shaft; plural paths of power flow between said input and output shafts; a single epicyclic gearing arrangement between said input and output shafts and located in one of said power paths; steplessly variable means adapted to extract power from one element of said epicyclic gearing arrangement and for returning it to a power-transmitting member of said transmission nearer said output shaft than the element from which said power was extracted; and means for supplying power to said one element of said epicyclic gearing arrangement which power is extracted from a power-transmitting member of said transmission nearer said prime mover than said last-mentioned element of said epicyclic gearing arrangement to which said power is supplied.

2. A variable-speed transmission comprising in combination, an input shaft adapted to be rotated and to be subjected to an input torque; an output shaft steplessly rotatable over a range from zero to speeds in excess of that of said input shaft; plural paths of power flow between said input and output shafts; a single epicyclic gearing arrangement in said transmission and located in one of said paths; an auxiliary steplessly variable-speed system having its one end connected to said epicyclic gearing arrangement and its other end connected to a back shaft within said other path of power that is adapted separately to be drivingly connected to either said input or output shafts; means for adjusting said transmission and said auxiliary system for causing power to flow from said epicyclic gearing arrangement through said system to said output shaft; and means for adjusting said transmission and said system for causing power to flow from said input shaft through said system to said epicyclic gearing arrangement.

3. A variable-speed transmission comprising in combination, an input shaft adapted to be rotated and to be subjected to an input torque; an output shaft steplessly rotatable over a speed range from zero to speeds in excess of that of said input shaft; plural paths of power flow between said input and output shafts; a single epicyclic gearing arrangement in said transmission and located in one of said paths and including a reactor; an auxiliary variable-speed system cooperating with said epicyclic gearing, said system including means adjustable to cause it to apply increasing torque on the reactor of said epicyclic gearing arrangement, whereby power created thereby is transmitted through said auxiliary variable-speed system to the output shaft of said transmission until maximum power from said input shaft is transmitted to said output shaft through said epicyclic gearing, and further means included in said system adjustable to cause said variable-speed system to decrease the speed of, while the torque on the reactor of said epicycle gearing arrangement remains substantially constant, whereby the power flowing through the auxiliary variable-speed system decreases with increasing speed of the output shaft; and means for adjusting said transmission and said auxiliary variable-speed system to cause power to flow from said input shaft to said epicyclic gearing arrangement to cause increasing speed of said output shaft while maintaining said output power substantially constant.

4. A variable-speed transmission comprising in combination, an input shaft adapted to be rotated; an output shaft adapted to be rotated at steplessly variable speeds; plural paths of power flow between said input and output shafts; a single epicyclic gearing arrangement including a reactor and located within said transmission in one of said paths; an auxiliary variable-speed system including first and second positive displacement hydraulic units for varying the torque on, and the speed of the reactor of said epicyclic gearing arrangement to produce the entire speed range of said output shaft; means for adjusting said transmission and said system to cause said first hydraulic unit to be driven as a pump by the reactor of said epicyclic gearing arrangement and said second unit to act as a motor for returning power to said transmission through a power-transmitting member thereof nearer the output shaft than the reactor of said epicyclic gearing arrangement; and means for further adjusting said transmission and system to cause said second hydraulic unit to be driven as a pump by the input shaft and said first unit to be driven as a motor for returning power to said transmission through the reactor of said epicyclic gearing arrangement.

5. A variable-speed transmission comprising in combination, an input shaft adapted to be rotated; an output shaft rotatable at steplessly variable speeds over a range from zero to speeds in excess of that of said input shaft; a single epicyclic gearing arrangement within said transmission including a reactor and having its input and output sides respectively connected to said input and output shafts; means for steplessly varying the torque on, and speed of said reactor to thereby vary the speed and torque of said output shaft throughout its entire range of operation, comprising steplessly variable means for extracting power from said reactor and for returning it to said transmission on the output side of said epicyclic gearing arrangement; and steplessly variable means for extracting power from the input side of said epicyclic gearing arrangement and for supplying it to said reactor.

6. A transmission comprising in combination, an input shaft adapted to be rotated and to be subjected to an input torque; an output shaft steplessly rotatable over a range of speeds from zero to speeds in excess of that of said input shaft; plural power paths between said input and output shafts; a single epicyclic gearing arrangement within said transmission and located in one of said paths;

an auxiliary stepless variable-speed system including an input and an output associated with said transmission; means for connecting the input and output of said system to the reactor of said epicyclic gearing arrangement and the output shaft, respectively, for speeds of the latter between zero and the base speed of said epicyclic gearing arrangement; and means for connecting the input and output of said system to the input shaft and the reactor of said epicyclic gearing arrangement, respectively, for speeds of the output shaft above base speed of said epicyclic gearing arrangement.

7. A variable-speed transmission comprising in combination, an input shaft adapted to be rotated and to be subjected to an input torque; an output shaft steplessly rotatable over a speed range from zero to speeds in excess of that of said input shaft; plural paths of power flow between said input and output shafts; a single epicyclic gearing arrangement having an input and output side within said transmission and located in one of said power paths; an auxiliary stepless variable-speed system associated with said variable-speed transmission; means for connecting said system to said epicyclic gearing arrangement in a manner to extract power from said epicyclic gearing arrangement and for passing it through said auxiliary system to the output side of said epicyclic gearing arrangement; and means for connecting said system to said input shaft in a manner to extract power from said input shaft and for passing it through said auxiliary system to said epicyclic gearing arrangement.

8. A variable-speed transmission comprising in combination, an input shaft adapted to be rotated and to be subjected to an input torque; an output shaft adapted steplessly to be rotated over a speed range from zero to speeds in excess of that of said input shaft; plural paths of power flow between said input and output shafts; a single epicyclic gearing arrangement having an input and an output side within said transmission and located in one of said power paths; an auxiliary variable-speed system including hydraulic positive displacement units associated with said variable-speed transmission; means for connecting said system to said epicyclic gearing arrangement in a manner to extract power from said epicyclic gearing arrangement and for passing it through said auxiliary system to the output side of said epicyclic gearing arrangement; and means for connecting said system to said input shaft in a manner to extract power from said input shaft and for passing it through said auxiliary system to said epicyclic gearing arrangement.

9. In a variable-speed transmission, an input shaft; an output shaft; one of which shafts is rotated at a substantially constant speed and the other of which shafts is steplessly rotatable over a range from zero to speeds at least equal to the speeds of the constantly rotating shaft; plural power paths between said input and output shafts; a single epicyclic gearing arrangement within said transmission and located in one of said paths and including a reactor; and means for steplessly varying the torque on, and the speed of the reactor of said epicyclic gearing arrangement to produce the entire speed range of said variable-speed shaft, comprising means for extracting power from a power-transmitting member of said transmission and adapted to return power to a power-transmitting member of the transmission nearer said output shaft than that from which said power was extracted.

10. A variable-speed transmission comprising in combination, a rotatable input shaft; a steplessly rotatable output shaft; plural paths of power flow between said input and output shafts; a single epicyclic gearing arrangement within said transmission and located in one of said paths and including a reactor; an auxiliary stepless variable-speed system connected between said input and output shafts for varying the torque on, and the speed of the reactor of said epicyclic gearing arrangement to produce the entire speed range of said output shaft; means for adjusting said transmission and system to cause said auxiliary variable-speed system to transfer power from the reactor of said epicyclic gearing arrangement to a power-transmitting member in said transmission nearer said output shaft than the reactor from which said power was extracted; and means for further adjusting said transmission and auxiliary variable-speed system to cause said system to transfer power from the input shaft to the reactor of said epicyclic gearing arrangement.

11. The method of operating a transmission of the type that includes plural paths of power flow between an input and output shaft, and in which a single epicyclic gearing arrangement is provided within said transmission and located in one of said paths, comprising the steps of steplessly extracting power from an element of said epicyclic gearing arrangement and for returning it to said transmission through a power-transmitting member thereof nearer the output shaft than the element from which said power was steplessly extracted; and thereafter, extracting power from said input shaft and supplying it to the element of said epicyclic gearing arrangement.

12. A variable-speed transmission comprising in combination, an input shaft adapted to be rotated and to be subjected to an input torque by a prime mover; an output shaft steplessly rotatable over a speed range from zero to speeds in excess of that of said input shaft; plural paths of power flow between said input and output shafts; an epicyclic gearing arrangement between said input and output shafts and located in only one of said power paths; means adapted steplessly to extract power from one element of said epicyclic gearing arrangement and for returning it to the other path of said transmission nearer said output shaft than the element from which said power was extracted; and means in said other path for supplying power to said one element of said epicyclic gearing arrangement which power is steplessly extracted from the input shaft of said transmission nearer said prime mover than said one element of said epicyclic gearing arrangement to which said power is supplied.

13. A variable-speed transmission comprising in combination, an input shaft adapted to be rotated and to be subjected to an input torque; an output shaft steplessly rotatable over a range from zero to speeds in excess of that of said input shaft; plural paths of power flow between said input and output shafts; an epicyclic gearing arrangement in said transmission and located in only one of said paths; an auxiliary variable-speed system having its one end connected to said epicyclic gearing arrangement and its other end connected to a back shaft within said other path of power flow that is adapted separately to be drivingly connected to either said input or output shafts; means for adjusting said transmission and said auxiliary system for causing power to flow from said epicyclic gearing arrangement through said system to said output shaft; and means for adjusting said transmission and said system for causing power to flow from said input shaft through said system to said epicyclic gearing arrangement.

14. In a variable-speed transmission, an input shaft adapted to be rotated; an output shaft steplessly rotatable over a range from zero to speeds in excess of that of said input shaft; plural power paths between said input and ouput shafts; an epicyclic gearing arrangement in said transmission and located in only one of said paths and including a reactor; and means for steplessly varying the torque on, and the speed of the reactor of said epicyclic gearing to produce the entire speed range of said output shaft, comprising means for steplessly extracting power from a power-transmitting member of said transmission and for returning power to said transmission through a power-transmitting member thereof nearer said output shaft than the power-transmitting member from which said power was extracted.

15. A variable-speed transmission comprising in combination, an input shaft adapted to be rotated and to be subjected to an input torque; an output shaft adapted steplessly to be rotated over a speed range from zero to speeds in excess of that of said input shaft; plural paths of power flow between said input and output shafts; a single epicyclic arrangement in said transmission and located in one of said paths and including a reactor; an auxiliary variable-speed system connected to the reactor of said epicyclic arrangement; means for clutching said system to either the input or output shafts, means for adjusting said clutch means and said auxiliary variable-speed system to cause it to apply increasing torque on the reactor of said epicyclic arrangement and for transferring power created thereby through said auxiliary variable-speed system to the output shaft of said transmission until maximum power from said input shaft is transmitted to said output shaft through said epicyclic arrangement; means for adjusting said auxiliary variable-speed system to cause said variable-speed system to decrease the speed of, while the torque on the reactor of said epicyclic arrangement remains substantially constant, whereby the power flowing through the auxiliary variable-speed system decreases with increasing speed of the output shaft; and means for adjusting said clutch means and said auxiliary variable-speed system to cause power to flow from said input shaft through said auxiliary variable-speed system to said epicyclic arrangement to cause increasing speed of said output shaft while maintaining said output power substantially constant.

References Cited in the file of this patent

UNITED STATES PATENTS

| | | |
|---|---|---|
| 1,648,969 | Steuart | Nov. 15, 1927 |
| 1,797,740 | Heyman | Mar. 24, 1931 |
| 1,935,018 | Chambers | Nov. 14, 1933 |
| 2,285,431 | Grossenbacher | June 9, 1942 |
| 2,311,691 | Porter | Feb. 23, 1943 |
| 2,517,188 | Feng | Aug. 1, 1950 |

FOREIGN PATENTS

| | | |
|---|---|---|
| 144,349 | Great Britain | June 10, 1920 |